(12) United States Patent
Duan et al.

(10) Patent No.: US 11,797,619 B2
(45) Date of Patent: Oct. 24, 2023

(54) CLICK INTENTION MACHINE LEARNED MODELS

(71) Applicant: Microsoft Technology Licensing, LLC, Redmond, WA (US)

(72) Inventors: Qing Duan, Santa Clara, CA (US); Junrui Xu, Fremont, CA (US); Huichao Xue, Santa Clara, CA (US); Jianqiang Shen, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 846 days.

(21) Appl. No.: 16/838,773

(22) Filed: Apr. 2, 2020

(65) Prior Publication Data
US 2021/0312237 A1 Oct. 7, 2021

(51) Int. Cl.
| | | |
|---|---|---|
| G06F 3/0482 | (2013.01) | |
| G06F 16/9535 | (2019.01) | |
| G06N 3/08 | (2023.01) | |
| G06F 18/214 | (2023.01) | |
| G06F 18/22 | (2023.01) | |

(52) U.S. Cl.
CPC ........ *G06F 16/9535* (2019.01); *G06F 3/0482* (2013.01); *G06F 18/2155* (2023.01); *G06F 18/22* (2023.01); *G06N 3/08* (2013.01)

(58) Field of Classification Search
CPC ....... G06N 3/08; G06F 18/22; G06F 18/2155; G06F 16/9535; G06F 3/0482
See application file for complete search history.

(56) References Cited

U.S. PATENT DOCUMENTS

| | | | | |
|---|---|---|---|---|
| 9,355,153 | B2 * | 5/2016 | Rehman | G06F 16/248 |
| 9,473,730 | B1 * | 10/2016 | Roy | H04H 60/33 |
| 10,013,892 | B2 * | 7/2018 | Aslan | G09B 19/00 |
| 11,281,858 | B1 * | 3/2022 | Mazor | G06F 16/3344 |
| 2012/0066073 | A1 * | 3/2012 | Dilip | G06Q 30/0269 |
| | | | | 709/204 |
| 2013/0290110 | A1 * | 10/2013 | LuVogt | G06Q 30/02 |
| | | | | 705/14.66 |

(Continued)

FOREIGN PATENT DOCUMENTS

JP 6017277 B2 * 10/2016

OTHER PUBLICATIONS

Sandro Sperandei, "Understanding Logistic Regression Analysis", published Nov. 26, 2013 to Biochemia Medica and available at http://dx.doi.org/10.11613/BM.2014.003 as of 2014, retrieved Mar. 19, 2023. (Year: 2014).*

(Continued)

*Primary Examiner* — Shourjo Dasgupta
(74) *Attorney, Agent, or Firm* — Schwegman, Lundberg & Woessner, P.A.

(57) ABSTRACT

In an example embodiment, a first machine learned model is trained to produce output, and a second machine learned model is then trained using training data that has been labeled, at least partially, using the output of the first machine learned model. The first machine learned model is trained to output a measure of how strong a positive signal in the training data really is. Specifically, this measure indicates the level of intention of a user who has engaged in a first user interface action with respect to a piece of content to engage in a subsequent second user interface action with the same piece of content.

18 Claims, 8 Drawing Sheets

(56) References Cited

U.S. PATENT DOCUMENTS

| | | | |
|---|---|---|---|
| 2014/0122355 A1* | 5/2014 | Hardtke | G06Q 10/1053 |
| | | | 705/321 |
| 2014/0122456 A1* | 5/2014 | Dies | G06F 16/9535 |
| | | | 707/723 |
| 2014/0278308 A1* | 9/2014 | Liu | G06F 16/958 |
| | | | 703/6 |
| 2016/0188725 A1* | 6/2016 | Wang | G06F 16/9535 |
| | | | 707/734 |
| 2017/0206457 A1* | 7/2017 | Roychowdhury | G06N 20/00 |
| 2018/0107663 A1* | 4/2018 | Lewis | G06F 16/438 |
| 2018/0173803 A1* | 6/2018 | Grover | G06Q 10/1053 |
| 2018/0218287 A1* | 8/2018 | Wang | G06Q 30/0201 |
| 2018/0268317 A1* | 9/2018 | Dharwadker | G06F 16/9535 |
| 2018/0336490 A1* | 11/2018 | Gao | G06N 20/00 |
| 2018/0337968 A1* | 11/2018 | Faulkner | H04L 51/046 |
| 2018/0349501 A1* | 12/2018 | Ramanath | G06F 16/285 |
| 2019/0034882 A1* | 1/2019 | Saha | G06N 20/00 |
| 2020/0026772 A1* | 1/2020 | Wheeler | G06F 16/248 |
| 2020/0065425 A1* | 2/2020 | Menguy | G06Q 30/0631 |
| 2020/0065772 A1* | 2/2020 | Whitehead | G06N 20/00 |
| 2020/0177942 A1* | 6/2020 | Wu | G06F 16/3347 |
| 2020/0364277 A1* | 11/2020 | Wang | G06F 16/9536 |
| 2021/0073673 A1* | 3/2021 | Janakiraman | G06N 20/00 |
| 2021/0217676 A1* | 7/2021 | Yeh | H01L 23/24 |

OTHER PUBLICATIONS

Shuvayan Das, "Beginners Guide to learn about Content Based Recommender Engines", published on Aug. 11, 2015 to https://www.analyticsvidhya.com/blog/2015/08/beginners-guide-learn-content-based-recommender-systems, retrieved Mar. 19, 2023. (Year: 2015).*

Eduardo Barbaro etc., "Modelling and predicting User Engagement in mobile applications", published in Data Science 3, pp. 61-77, 2020, retrieved Aug. 15, 2023. (Year: 2020).*

Chad Crowe, "Predicting User Interaction on Social Media using Machine Learning", published in Student Work, 2018, and accessible at https://digitalcommons.unomaha.edu/studentwork/2920, retrieved Aug. 15, 2023. (Year: 2018).*

Alipio Mario Jorge etc., "A study of machine learning methods for detecting user interest during web sessions", published or available at IDEAS14, Jul. 7-9, 2014, Porto, Portugal, retrieved Aug. 15, 2023. (Year: 2014).*

Brownlee, Jason, "How to Identify Outliers in your Data", Retrieved from: https://machinelearningmastery.com/how-to-identify-outliers-in-your-data/, Dec. 31, 2013, 13 Pages.

* cited by examiner

CLICK INTENTION MACHINE LEARNED MODELS

TECHNICAL FIELD

The present disclosure generally relates to technical problems encountered while determining relevance of user clicks in a user interface. More specifically, the present disclosure relates to the use of machine learned models to predict the intention of users when performing user clicks in a user interface.

BACKGROUND

The rise of the Internet has occasioned two disparate yet related phenomena: an increase in the presence of social networking services, with their corresponding user profiles visible to large numbers of people, and an increase in the use of these social networking services to provide content. An example of such content is a social media post, where a user can post information, such as text, pictures, videos, articles, and so forth for other users to view.

Social networking services act to ensure that user engagement, meaning the amount of time and effort a user spends engaging with the social networking service, is high. Examples of such user engagement include browsing user profiles, looking through job listings, sending communications to other users of the social networking service, performing searches, clicking on feed items, and so forth.

One way to encourage user engagement is to provide relevant content to users, whether in response to an explicit user request for content or if content is served to the user without an explicit request. For example, if a user is searching for job listings, providing a job listing that the user is unlikely to be interested in will likely discourage user engagement, while providing a job listing that the user is likely to be interested in will encourage user engagement. The same is true if, for example the job listing is provided to the user who may not be explicitly searching for job listings.

Traditionally, machine learned models have been utilized to predict the likelihood that a user will engage with a piece of content. In the case of job listings, for example, these machine learned models are trained using positive signals such as previous clicks on the job listing (a click being a user action causing details of the job listing to be viewed in the user interface) and previous apply commands (an apply command being a user action causing an application for the job opening corresponding to a job listing to be initiated). While the user intent behind an apply command may be clear (the user wishes to apply for the job, which indicates a high degree of relevance for the job listing for the user), the user intent behind a click on a job listing may not be clear. While in some cases the user may indeed be very interested in potentially applying for the job corresponding to the job listing click, in other cases, the user may simply be curious about the job listing with no real intention to apply for the job. In still other cases, the user may be very interested about the job listing but not for themselves (perhaps looking on behalf of a family member or friend).

The result of this, however, is that prior machine learned models are technically problematic as they are unreliable in certain circumstances, as they have been trained using data that contains false positives. In the case of job listings, these false positives include clicks on job listings when the user has no real intention of applying for the corresponding job.

What is needed is a solution that reduces or eliminates this technical problem with prior machine learned models.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
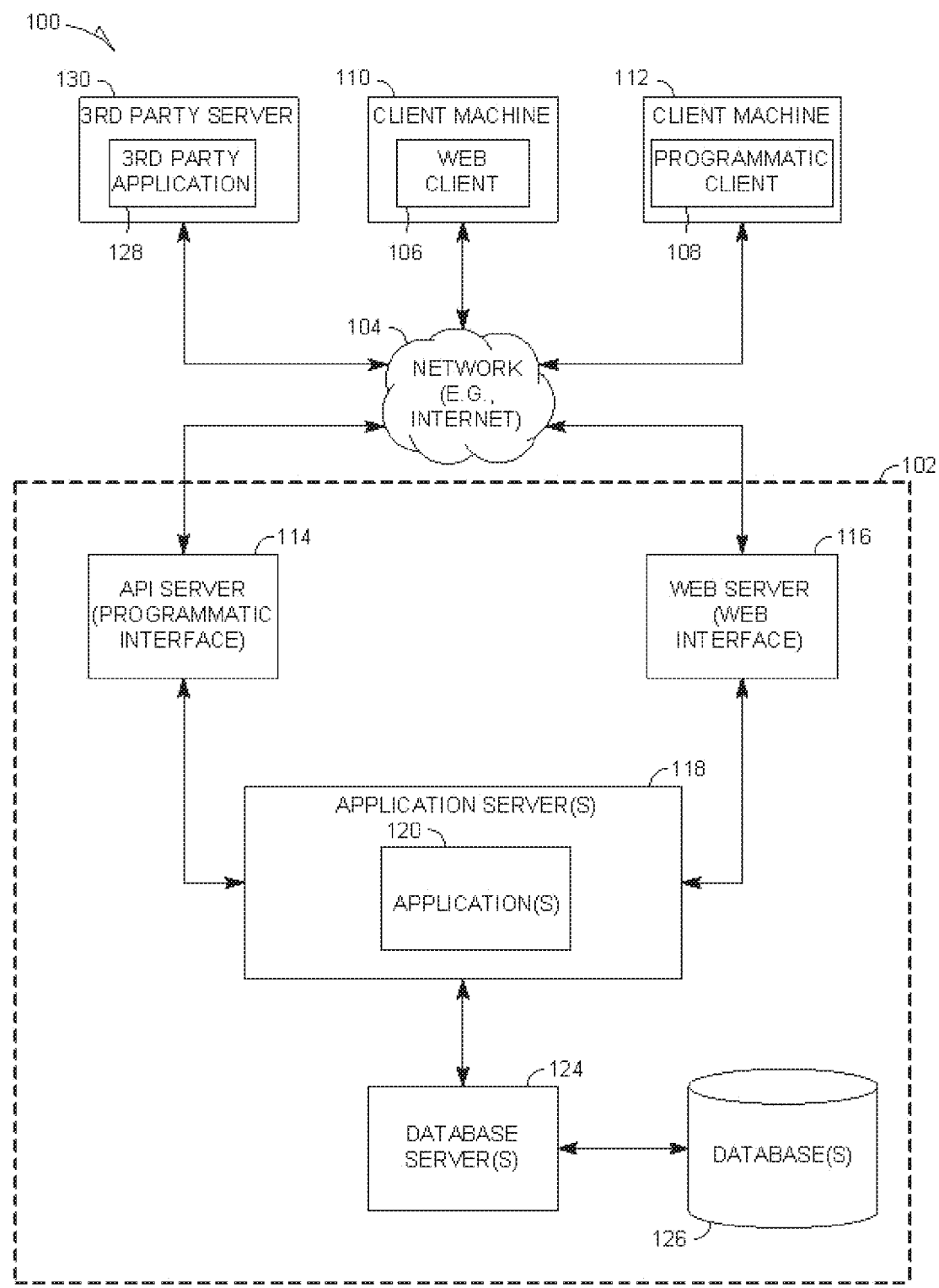
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a first machine learned model is trained to produce output, and a second machine learned model is then trained using training data that has been labeled, at least partially, using the output of the first machine learned model. The first machine learned model is trained to output a measure of how strong a positive signal in the training data really is. Specifically, this measure indicates the level of intention of a user who has engaged in a first user interface action with respect to a piece of content to engage in a subsequent second user interface action with the same piece of content. The types of the first user interface action and the second user interface action may vary based on implementation. In one example embodiment, the first user interface action is a click user interface action, which causes details about the piece of content to be displayed in the user interface, while the second user interface action is a subsequent interaction with that same piece of content (such as applying for a job corresponding to a job listing, if the piece of content is the job listing).

More particularly, labels applied to the training data used to train the second machine learned model are generated or modified to include the measure of the strength of the positive signal, as opposed to merely using the existence or lack of positive signal as a training label. When the second machine learned model is then trained using this uniquely labeled training data, the result is that the resultant predications made by the second machine learned model are more reliable than those of previous machine learned models.

The first machine learned model is a neural network that has been trained on its own labelled set of training data. The neural network is trained to output an embedding for any entities, such as users or pieces of content, in the training data. These embeddings are mappings of the corresponding entities into a D-dimensional space.

The embeddings are then utilized to calculate two separate scores that are then used together to calculate a user interest level for a pair of a user and a piece of content. The first of these scores is an entity similarity score that is calculated by determining a geometric distance between the embedding for the user and the embedding for the piece of content in the D-dimensional space. The second of these scores is an activity similarity score that is computed by aggregating embeddings for any pieces of content on which the first user performed a partially positive action; performing a function, such as an average, on the aggregated embeddings to calculate a user activity embedding; and then computing a dot product of the user activity embedding and an embedding for the first piece of content. The user interest level may then be calculated as a weighted sum of the entity similarity score and the activity similarity score.

DESCRIPTION

While the proposed methodology may be utilized for a number of different types of pieces of content and user interface action types, in an example embodiment, it is applied specifically to the case of user interface "clicks" and "applies" on job listings. For ease of discussion, the job listing embodiment will be described throughout this document, but the claims shall not be interpreted as limiting the scope of protection to job suggestions unless explicitly recited.

In machine learning, features are values of data used to both train a machine learned model and to evaluate the machine learned model against a particular item/user. During the training process, the features of values of training data are combined with labels applied to the training data to identify positive and negative cases for a machine learning algorithm to utilize when performing the training. In an example embodiment, the features utilized include user feature data. The user feature data may include information from a user's profile, such as seniority, industry, title, company, functions, field of study, education, skills, location, and so forth. Usage information, such as user interface actions by users corresponding to the user feature data, may be used to provide labels to the training data. These user interface actions may include, as described above, clicks and applies.

During the machine learning process, the machine learning algorithm uses the training data and labels to determine weights (coefficients) assigned to each of the features. These weights help define the machine learned model, which can then be used at an evaluation time to provide a prediction of a likelihood that a specific user will perform an action, such as an apply, by multiplying the weights by the corresponding feature values for the specific user.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
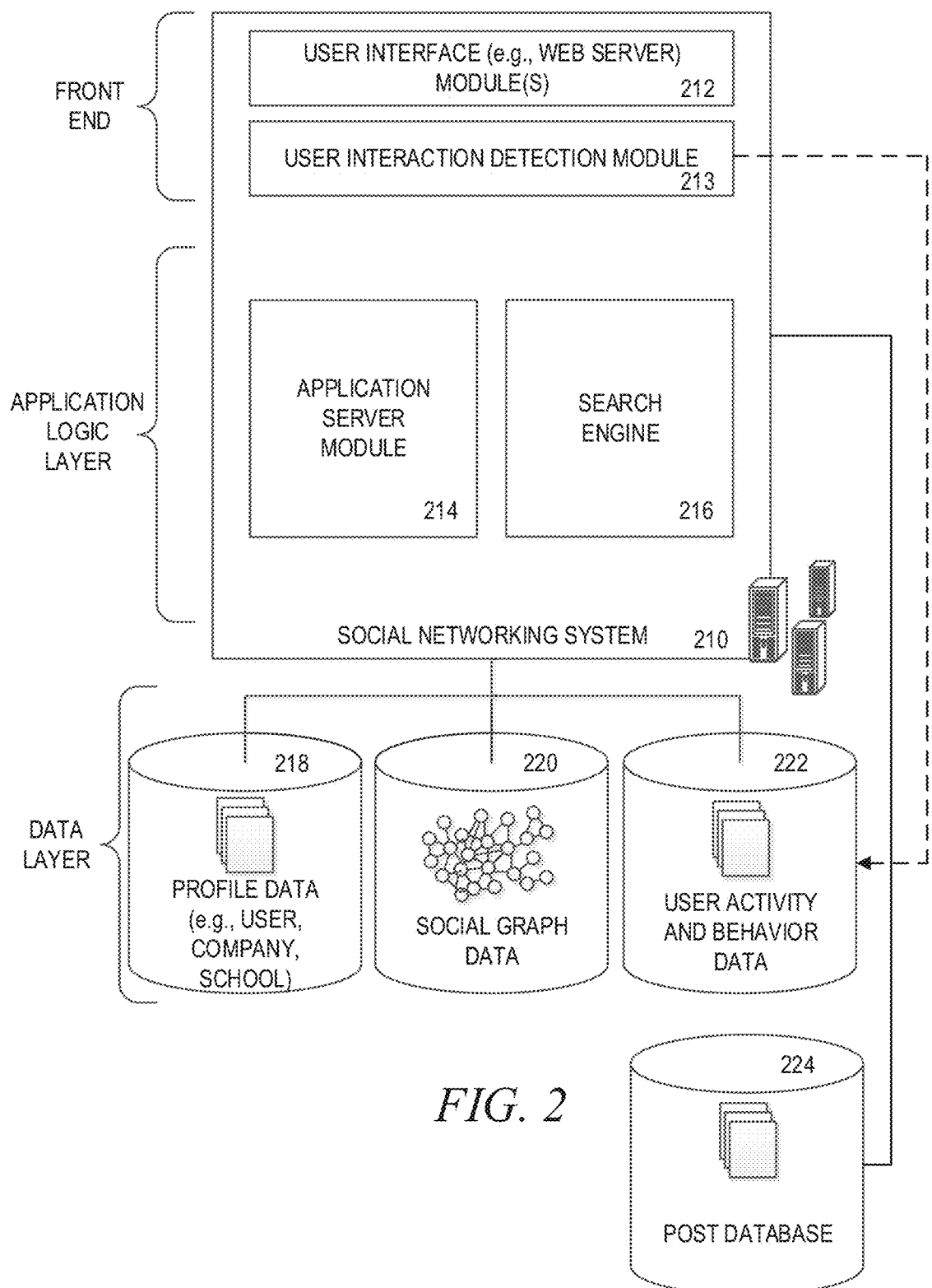
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, a social networking system 210 provides an API module via which applications 120 and services can access various data and services provided or maintained by the social networking service. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of social media posts to display to users. These social media posts may be directly or indirectly generated from user activity within the social networking service, and may be stored in post database 224. Examples of social media posts directly generated from user activity include the user themselves posting text, image, or video information as a post. Examples of social media posts indirectly generated from user activity include the social networking service itself generating the post when the user has a change in their profile, or when the user is mentioned in an article, etc.

Figure 3:
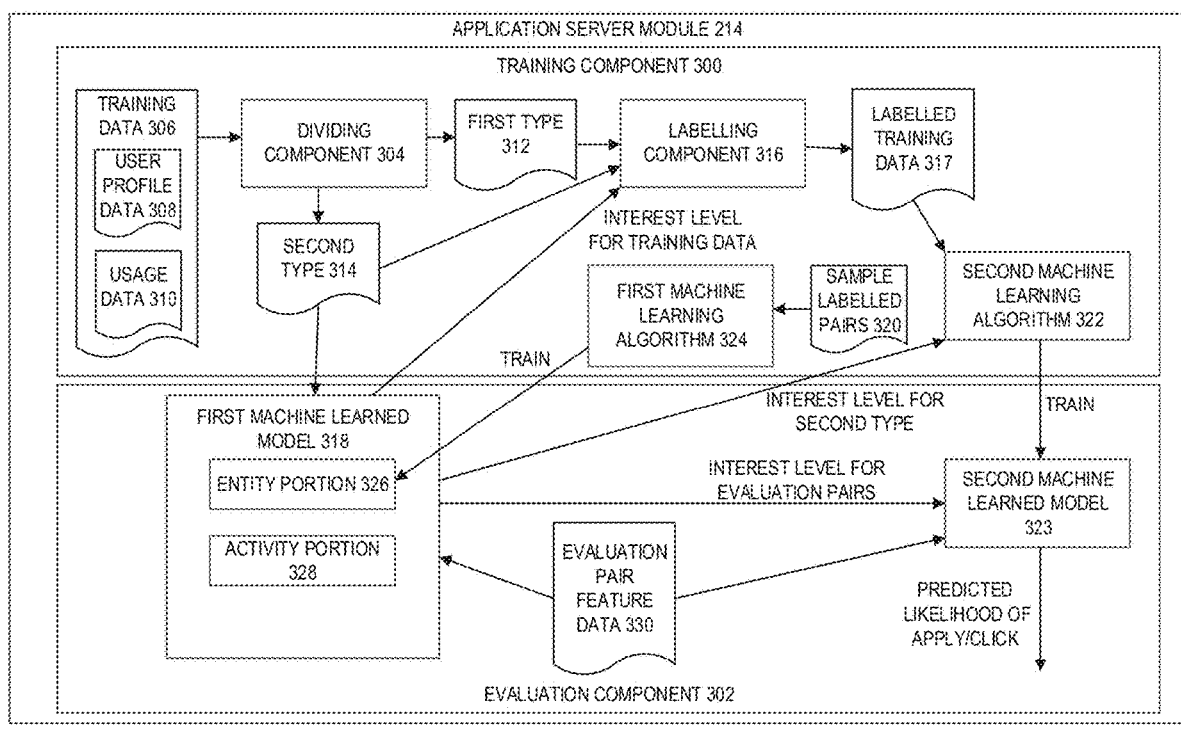
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

Specifically, the application server module 214 can be divided generally into a training component 300 and an evaluation component 302. The training component 300, as will be described, uses various features and machine learning algorithms to train one or more machine learned models. The outputs of the machine learned model(s) are (potentially different) coefficients for each instance feature. The evaluation component 302 then uses these coefficients to make runtime decisions as to which pieces of content to display to a user.

As described earlier, a unique measure of degree of positivity for a label used during machine learning training is introduced. This measure will now be described in more detail before describing its use during the training and how the training integrates with the training component 300.

Figure 4:
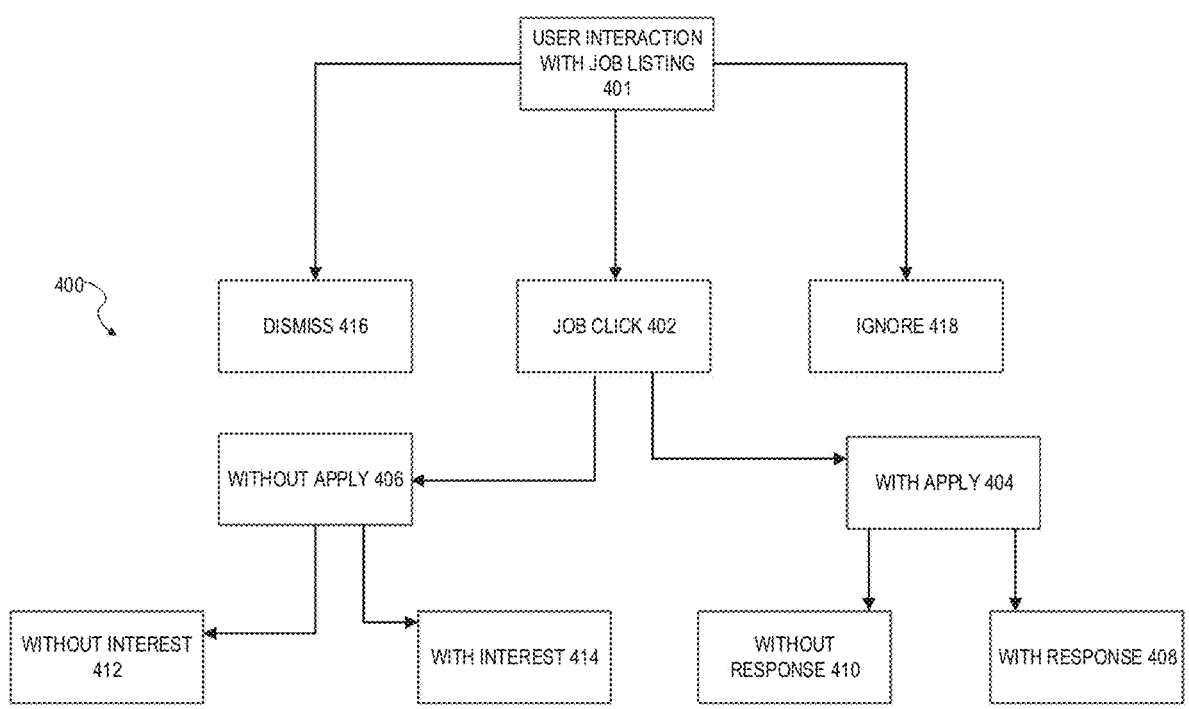
FIG. 4 is a block diagram illustrating a click intention hierarchy, in accordance with an example embodiment.

FIG. 4 is a block diagram illustrating a click intention hierarchy 400, in accordance with an example embodiment. This hierarchy depicts the different types of responses/intent that can be assigned to a user interaction with a job listing 401 in a user interface. Reference numeral 402 represents a "job click" itself. A "job click" is the act of the user, within the graphical user interface, initiating a selection of the job listing for viewing, such as by using a mouse to navigate a cursor over a selectable title of the job listing and pressing the mouse button, or performing the equivalent action using another input device. Of all job clicks, a certain percentage will result in a subsequent second user interface action (such as an apply 404) while a certain percentage will result in no subsequent second user interface action (without apply 406). Of those that resulted in an apply 404, a certain percentage will result in a positive response 408 (such as actually being hired), while a certain percentage will result in a negative response 410 (such as not being hired). The reference numerals 404, 408, and 410 associated with the apply are typically labelled as positive signals using a binary system (i.e., assigned a value of 1). Since the "intention," as it were, of the user in clicking on the job listings in these cases is fairly clear by virtue of the fact that the user ultimately applied for the underlying job, these represent fairly straightforward use cases to model. It should be noted that the inclusion of the with response 408 and without response 410 categories in this figure is for completeness, as such categories may be useful in other types of machine learned models that may be used to predict other actions, such as the likelihood of the user actually obtaining a job corresponding to a job listing. Since the present model(s) are geared towards predictions about whether or not a user will apply in the first place, the distinction between with response 408 and without response 410 is largely academic, since both are considered positive results and will be assigned a top positive score (e.g., 1) as both involved the user actually applying for the corresponding job.

On the without apply 406 side however, the user intent is less clear. A certain percentage of users in such cases had no intention of applying for the underlying job when clicking on the job listing. These are represented as reference numeral 412. On the other hand, a certain percentage of users in such cases did have an intention of (potentially) applying for the underlying job when clicking on the job listing. These are represented as reference numeral 414.

All training data may fall under one of reference numerals 408, 410, 412, or 414 in FIG. 4. Training data falling under reference numerals 408, 410 may be assigned a label having fully positive score (such as 1) when used to train a machine learned model to predict a likelihood that a user will apply for a given job listing. Training data falling under reference numerals 412, 414, however, will be assigned a score that is less than fully positive (e.g., between 0.000001 and 0.999999) when used to train the machine learned model.

In an example embodiment, the scores assigned to training data falling under reference numerals 412, 414 may themselves be derived using a different machine learned model that outputs a score indicating the degree of interest a user has in potentially applying for a particular job listing that he or she has clicked on. The scores themselves will determine which category (either 412 or 414) will be used for a particular data point. Specifically, if a score assigned to a piece of training data is closer to 1 then that implies that there is high probability that the corresponding user, despite not applying, has a high degree of interest in the job listing, whereas if the score assigned to the piece of training data is closer to 0 then that implies that there is a low probability that the corresponding user has a high degree of interest in the job listing. In some example embodiments, no matter the score, the piece of training data relating to a job client 412 but without apply 406 is assigned to one of the two categories 412, 414. For example, if the score is 0.5 or higher, it is assigned to the with interest 414 category, whereas if the score is less than 0.5, it is assigned to the without interest 412 category. In other example embodiment, there may be a middle ground of training data scores which do not get categorized and their corresponding data points are discarded for training purposes. For example, in some example embodiments, training data with scores of 0.3 or less are assigned to the without interest 412 category while training data with scores of 0.7 or higher are assigned to the with interest 414 category. In such an embodiment, training data with scores between 0.3 and 0.7 are discarded, since they may be viewed as being unreliable indicators of whether or not the corresponding user has interest in the corresponding job listing.

Other type of negative interactions with the job listing, such as dismissing 416 or ignoring 418 the listing will also be assigned a negative label (such as 0).

Referring back to FIG. 3, it can be seen that training component 300 has a training data dividing component 304, which acts to divide training data 306, which includes user profile data 308 and usage data 310 of users who clicked on job listings, into two types: the first type 312 is training data that can be assigned a label based directly on the corresponding usage data 310. The second type 314 is training data that cannot be assigned a label based directly on the corresponding usage data 310 and instead is such that the label is deduced through a machine learned model. This division may be based upon whether the corresponding training data showed a subsequent application to the corresponding job. In the example of FIG. 4, the first type 312 of training data is data classified in the with apply 404 category and the second type of training data is data classified in the without apply 406 category. The first type 312 of training data is passed to a labelling component 316, which assigns the labels to the first type 312 of training data based on the corresponding usage data 310 (e.g., assigning a "1" as the label). The second type 314 of training data is passed to a first machine learned model 318 to predict the interest level of a given user who has clicked on a given job listing. This first machine learned model 318 may be used to predict interest levels for the second type 314 of training data, and these interest levels may be used by the labelling component 316 to label the second type 314 of training data. In one example embodiment, these interest levels are normalized to be assigned a label value between (but not including) 0 and 1. The labelled training data 317 will ultimately be used by a second machine learning algorithm 322 to train a second machine learned model 323 to predict a likelihood that a given user will apply to a job corresponding to a given job listing.

The second type 314 of training data is passed to a first machine learned model 318 to predict the interest level of a given user who has clicked on a given job listing. This first machine learned model 318 may be used to predict interest levels for the second type 314 of training data, and these interest levels may be used by the labelling component 316 to label the second type 314 of training data. In one example embodiment, these interest levels are normalized to be assigned a label value between (but not including) 0 and 1.

The first machine learned model 318 may also be used to predict interest level for users when the second machine learned model 323 evaluates combinations of users and job listings at evaluation time, as that interest level may be used as a feature of the second machine learned model 323.

The first machine learned model 318 may be trained by a first machine learning algorithm 324. The first machine learned model 318 includes an entity portion 326, which is a neural network trained by the first machine learning algorithm 324 to output an entity similarity score, and an activity portion 328, which calculates an activity similarity score via a dot product operation. The first machine learned model 318 then calculates the interest level of a given user in a given job listing based on both the entity similarity score for the pair and the activity similarity score for the pair.

In an example embodiment, the neural network in the entity portion 326 is trained using sample labelled pairs 320 of features about a user and features about a job listing with which the user interacted or is otherwise associated with in some way. The labels may be considered either positive, such as when the user applied for the job associated with the job listing or the user actually works at the job associated with the job listing, or negative, such as when the user dismissed the job listing when presented with it in a user interface, or skipped the job listing when presented with it in a user interface (skipping may be determined by the user having, for example, selected on a job listing presented both before and after the job listing in the user interface, but not selecting on the job listing itself). It should be noted that while a label may be termed "positive" or "negative," this does not necessarily correlate with the sign of the actual value of the label. Thus, for example, a positive label may be "1" while a negative label may be "0." There is no need for a negative label to be a negative number.

A neural network is a deep learning machine learning model that contains layers of interconnected nodes. Each node is a perceptron and is similar to multiple linear regression. The perceptron feeds the signal produced by multiple linear regression into an activation function that may be nonlinear. In a multi-layered perceptron (MLP), perceptrons are arranged in interconnected layers. The input layer collects input patterns. The output layer has classifications or output signals to which input patterns may map.

Hidden layers fine-tune the input weightings until the neural network's margin of error is minimal. The hidden layers extrapolate salient features in the input data that have predictive power regarding the outputs.

In an example embodiment, the sample labelled pairs of features about a user and features about a job listing may take the form of a concatenation of a user feature vector and a job feature vector, along with a label, such as in the form: <user feature vector+job feature vector, label>. These sample labelled pairs of features may be passed to a neural network machine learning algorithm that is trained to learn embeddings of the users and job listings based on the labels in the training data. An embedding is a mapping of a user or job listing into a point in a D-dimensional space. Here, D may be a value selected by an administrator that balances reliability of the entity embedding with system performance. In an example embodiment, D may be 200.

By mapping each user and each job listing into a different point in a D-dimensional space, a similarity score between a given user and a given job listing can be calculated based on the geometric distance between the embedded points corresponding to the given user and the given job listing in the D-dimensional space.

While the entity similarity score may provide a good estimate of how likely a user is to be interested in a given job posting based on the similarity between the user's profile and the job listing, there are circumstances where the entity similarity score alone would be an inaccurate measure of user intent and interest. For example, there are cases where users have not updated their profile or even are missing large amounts of information in their profile (e.g., a nearly empty profile). Additionally, there may be instances where a user may simply be interested in a job listing that is not related to any information in their profile, such as if the user is contemplating a career change (e.g., currently employed as a software engineer and contemplating becoming a nurse) or if the user is searching job listings on behalf of a family member or friend. Thus, an activity similarity score may be calculated to help capture intent in these circumstances.

In an example embodiment, the activity similarity score is computed by leveraging the embeddings learned by the first machine learned model 318. Specifically, the job listing embeddings for all job listings clicked on during a preset period (e.g., last 28 days) may be aggregated. A function (such as average or mean) may be applied to these aggregated embeddings to arrive at a user activity embedding for the user. A dot product may then be computed between the user activity embedding for the user and a job listing embedding to arrive at an activity similarity score between the user and the job listing.

As stated earlier, the first machine learned model 318 then calculates the interest level of a given user in a given job listing based on both the entity similarity score for the pair and the activity similarity score for the pair. In an example embodiment, this calculation may be based on a weighted sum, such as $$clickInterestDegree = \frac{w_{entity} * similarityScore_{entity} + w_{activity} * similarityScore_{activity}}{w_{entity} + w_{activity}}$$

$$clickInterestDegree \in (0, 1]$$

where $w_{entity}$ is a weight assigned to the entity similarity score and $w_{activity}$ is a weight assigned to the activity similarity score.

It should be noted that in some example embodiments, other functions may be used in conjunction with or in lieu of average or mean in this calculation. For example, minimum and maximum functions may be applied to the aggregation of embeddings and dot product performed on the results of these functions with the job listing embedding to arrive at other types of similarity scores that can be assigned their own weights in the weighted sum calculation.

The output of the first machine learned model 318 is a prediction of an interest level of a user in a job listing. As stated earlier, this prediction may be used by the labelling component 316 to label the second type 314 of training data, and also may be used as a feature of the second machine learned model 323, which is trained by the second machine learning algorithm 322 to predict a likelihood that a given user will apply to a job corresponding to a given job listing.

The second machine learning algorithm 322 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors).

The second machine learning algorithm 322 learns weights to be applied to input features exacted from various data sources. As stated above, one of those features is the prediction output by the first machine learned model 318, but other features are utilized as well, such as features extracted from user profiles, job listings, usage information, and so forth.

Depending upon how labeling is applied, the first machine learned model 320 may perform prediction of clicking (selecting) a job listing or alternatively may perform prediction of applying for a job associated with a job listing. In other example embodiments, the above techniques may be applied to any area where there are multiple types of positive signals of varying degrees. Specifically, positive signals may be divided into fully positive (such as, for the case of job listings, applying to the job associated with a job listing), partially positive (such as, for the case of job listings, clicking on a job listing), and negative (such as, for the case of job listings, skipping over/ignoring (such as 418 in FIG. 4) or dismissing (such as 416 in FIG. 4) a job listing). Other types of online content may have similar types of divisions of fully positive and partially positive signals. One example is in content related to online transactions, such as purchases of an item, where clicking to view an item is a partially positive signal whereas actually purchasing the item is a fully positive signal.

At evaluation time, a pair of a given user and a given job listing may be evaluated to determine the predicted likelihood that the given user will click on the given job listing or (again, depending on how the models are trained) the likelihood that the given user will apply for the job associated with the job listing. Evaluation pair feature data 330 may include features extracted from information about the pair, such as from profile data of the given user, usage information of the given user, and text of the job listing. The evaluation pair feature data 330 may be passed to the first machine learned model 318 to output an interest level for each of the evaluation pairs to the second machine learned model 323, which as described earlier is a feature used by the second machine learned model 323 in making its prediction. The second machine learned model 323 may also use the evaluation pair feature data 330 directly as features in making its prediction. While this may essentially result in the evaluation pair feature data 330 being used twice, in one of the instances the evaluation pair feature data 330 is only used indirectly, by being used compute the interest level. This embodiment recognizes that there may be independent value in use of the evaluation pair feature data 330 directly that doesn't involve its effect on interest level. The result is a predicted likelihood of apply or click for every user/job listing pair evaluated.

In some example embodiments, the predicted click interest degree may be applied to further compute a prediction of an apply interest degree. For example, some users may apply for a job that they may not be fully interested in accepting if offered, merely to gauge interest from the hiring company or to use as a bargaining tool for another job they are more interested in. The click interest degree may be used to then aid in this prediction of the apply interest degree as a user with a high click interest degree is likely to also have a high apply interest degree. Specifically, a user with a high click interest may be assigned a higher apply interest prediction score than a user with a low click interest, independent of any other factors used to predict a user's likelihood of applying.

Figure 5A:
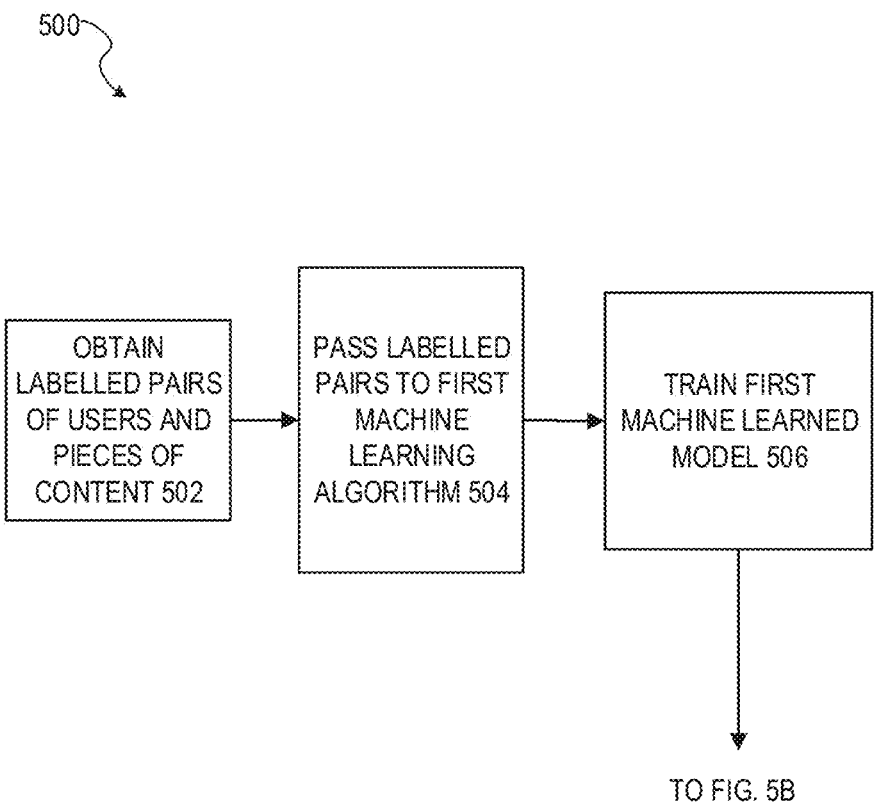
FIGS. 5A-5B are flow diagrams illustrating a method for predicting a level of user interest in a piece of content, in accordance with an example embodiment.
Figure 5B:
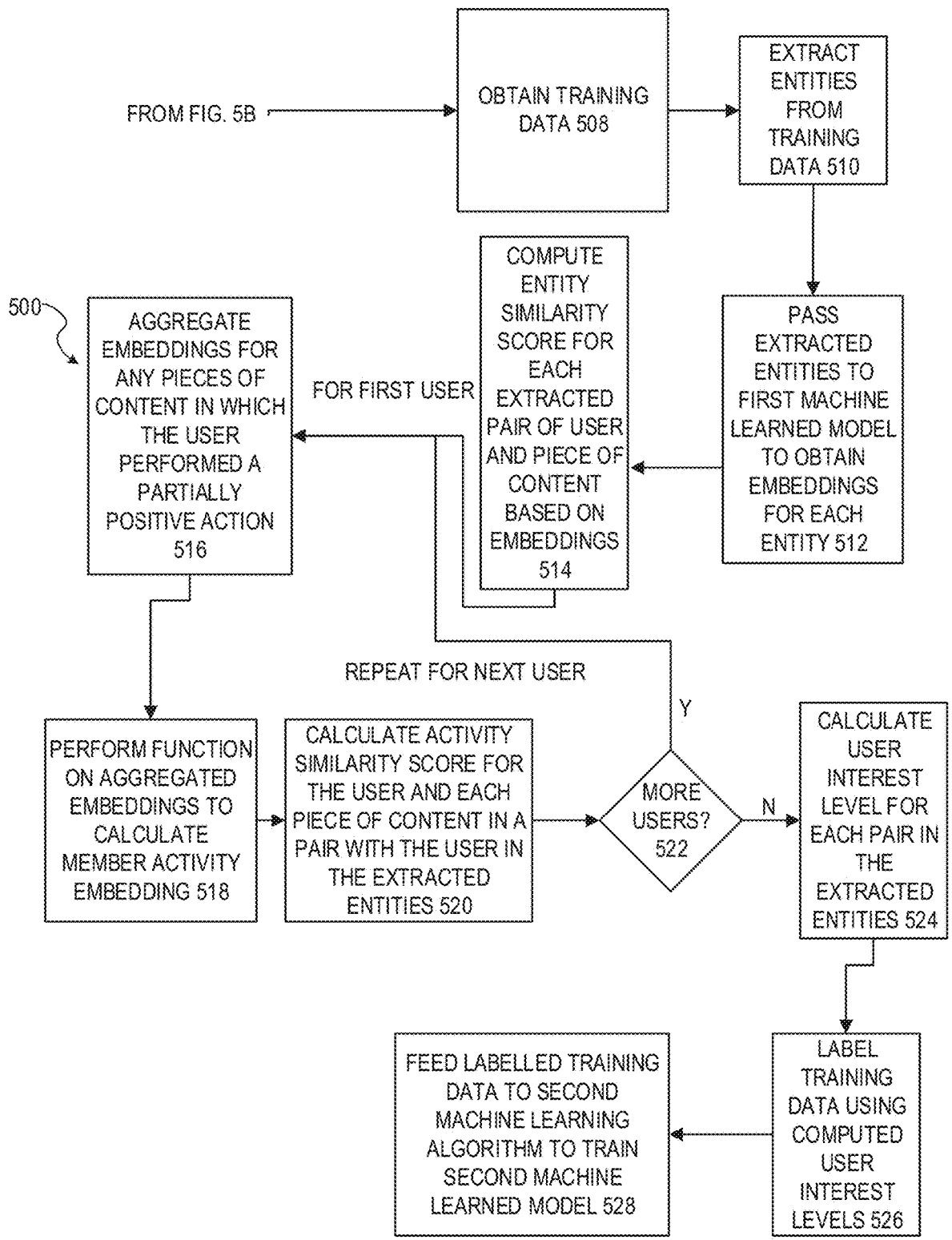

FIGS. 5A and 5B are flow diagrams illustrating a method 500 for predicting a level of user interest in a piece of content, in accordance with an example embodiment. Beginning in FIG. 5A, at operation 502, labelled pairs of users and pieces of content are obtained. The pieces of content may be obtained from, for example, a profile database 218 and/or a post database 224. Each labelled pair includes features of a given user, features of a given piece of content, and a label corresponding to the given user and the given piece of content. The label is indicative of a positive or negative association between the given user and the given piece of content. In an example embodiment, the label may be a score between 0 and 1, with 0 being the most negative association between the given user and the given piece of content (i.e., the user has absolutely no interest in the piece of content) and 1 being the most positive association between the given user and the given piece of content (i.e., the user has complete interest in the piece of content). In order to deal with the fact that there is often a delay between when a person clicks on a job listing, for example, and then that same person applies for a job associated with that job listing, only data older than a preset period of time from the current date/time may be examined. For example, if one assumes that users will typically apply for jobs they are interested in within a week of clicking on the corresponding job listing, then only data that is at least a week old may be considered for inclusion in the set being used to train the first machine learned model. At operation 504, the labelled pairs of users and pieces of content are passed to a first machine learning algorithm to train a first machine learned model to output an embedding for an input entity, the entity being a user or a piece of content. The embedding describes a mapping of the entity to a point in a D-dimensional space, where D is a fixed number of dimensions.

Turning to FIG. 5B, at operation 508, training data for a second machine learned model is obtained. The training data includes entities and usage data. Once again the entities constitute both users and pieces of content. The usage data indicates fully positive actions and partially positive actions performed by users on pieces of content. A fully positive action may be defined by a graphical user interface action that is an end goal of a choice to display a piece of content to a user, such as applying for a job associated with a job listing presented to a user, or purchasing a product associated with a product listing presented to a user. A partially positive action may be a graphical user interface interaction performed by the user that is an action that indicates some level of interest in the corresponding piece of content without actually being the end goal of the display of the piece of content to the user, such as clicking on an identification or summary of the piece of content in a list of identifications or summaries of pieces of content in order to display additional details about the piece of content (or display the piece of content itself).

At operation 510, users and pieces of content are extracted from the training data. The users and pieces of content that are extracted are pairs of users and pieces of content in which the user in the pair has performed a partially positive action but not a fully positive action in the usage data on the piece of content in the pair. At operation 512, the extracted entities are passed to the neural network, to obtain an embedding for each passed entity.

At operation 514, an entity similarity score is computed for each extracted pair of user and piece of content in the extracted entities, based on their embeddings. This may be performed by computing a distance (e.g., Chebyshev distance, Euclidean distance, Manhatyte distance, Minkowski distance, Pythagorean distance, Haversine distance, etc.) between the user embedding and the piece of content embedding, in the D-dimensional space, in the pair.

A loop is then begun for each user in the extracted entities. At operation 516, embeddings for any pieces of content on which the user performed a partially positive action are aggregated. At operation 518, a function is performed on the aggregated embeddings to calculate a user activity embedding. In an example embodiment, this may comprise an average, mean, minimum, or maximum function.

At operation 520, an activity similarity score is calculated for the user and each piece of content in a pair with the user in the extracted entities, based on the user activity embedding and an embedding for the first piece of content. This activity similarity score may be computed by computing a dot product of the user activity embedding and the embedding for the corresponding piece of content. At operation 522, it is determined if there are any additional users in the extracted entities. If so, then the method 500 loops back to operation 516 for the next user. If not, then at operation 524, a user interest level for each pair in the extracted entities is calculated based on the entity similarity score for the pair and the activity similarity score for the pair. In an example embodiment, this may be performed by calculating a weighted sum of the entity similarity score and the activity similarity score.

At operation 526, the training data may be labelled using the computed user interest levels. At operation 528, the labelled training data may be fed to a second machine learning algorithm to train the second machine learned model. The second machine learned model may use features of a pair of a user and a piece of content at evaluation time along with a user interest level for the pair as computed using the first machine learned model to output a prediction of a likelihood of the user performing a positive action on the piece of content.

Note that FIGS. 5A and 5B describe the training of the second machine learned model, which includes both training of the first machine learned model and using the first machine learned model. The actual use of the second machine learned model to predict likelihood of performing a positive action on the piece of content is performed subsequently to the operations in FIGS. 5A and 5B.

Figure 6:
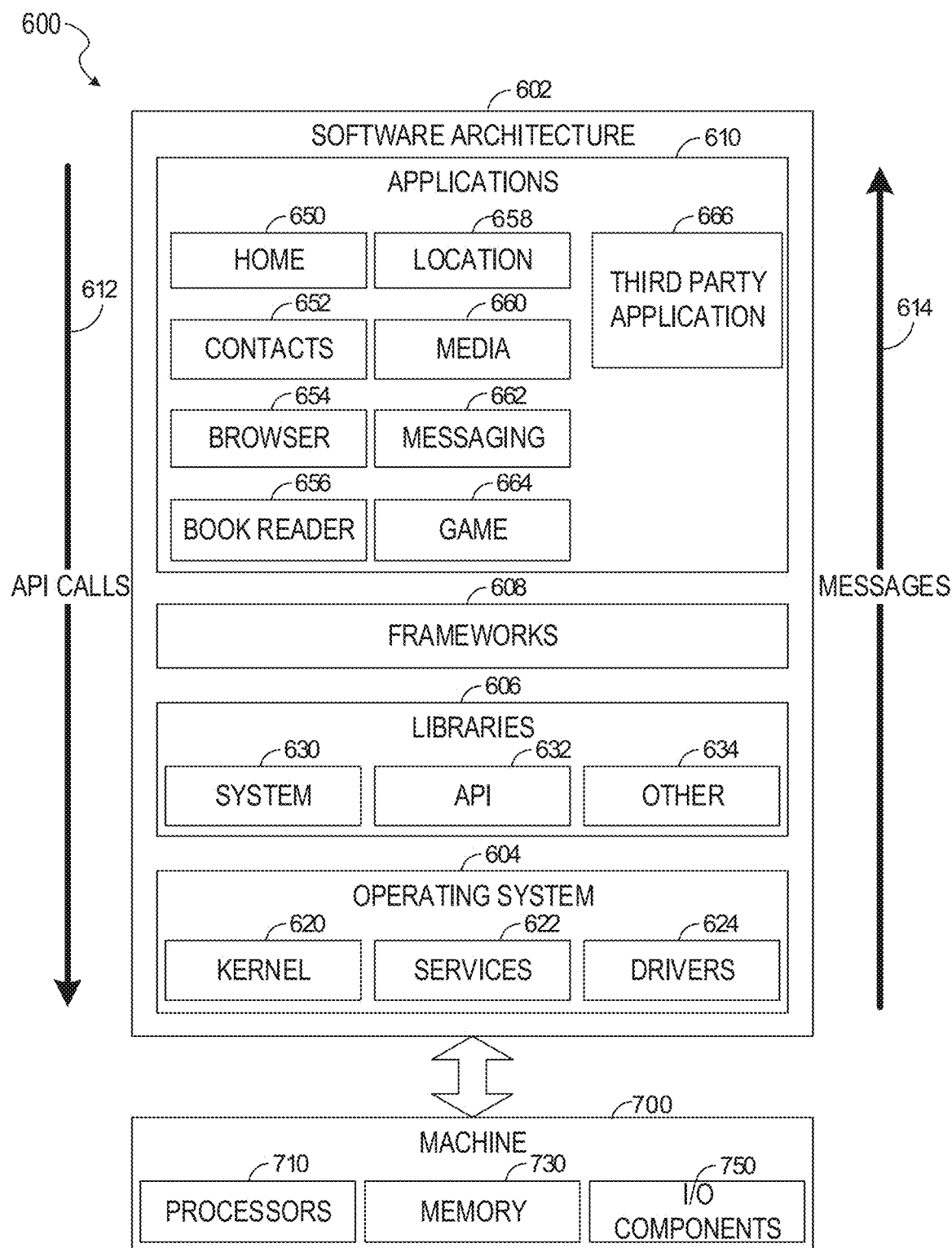
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
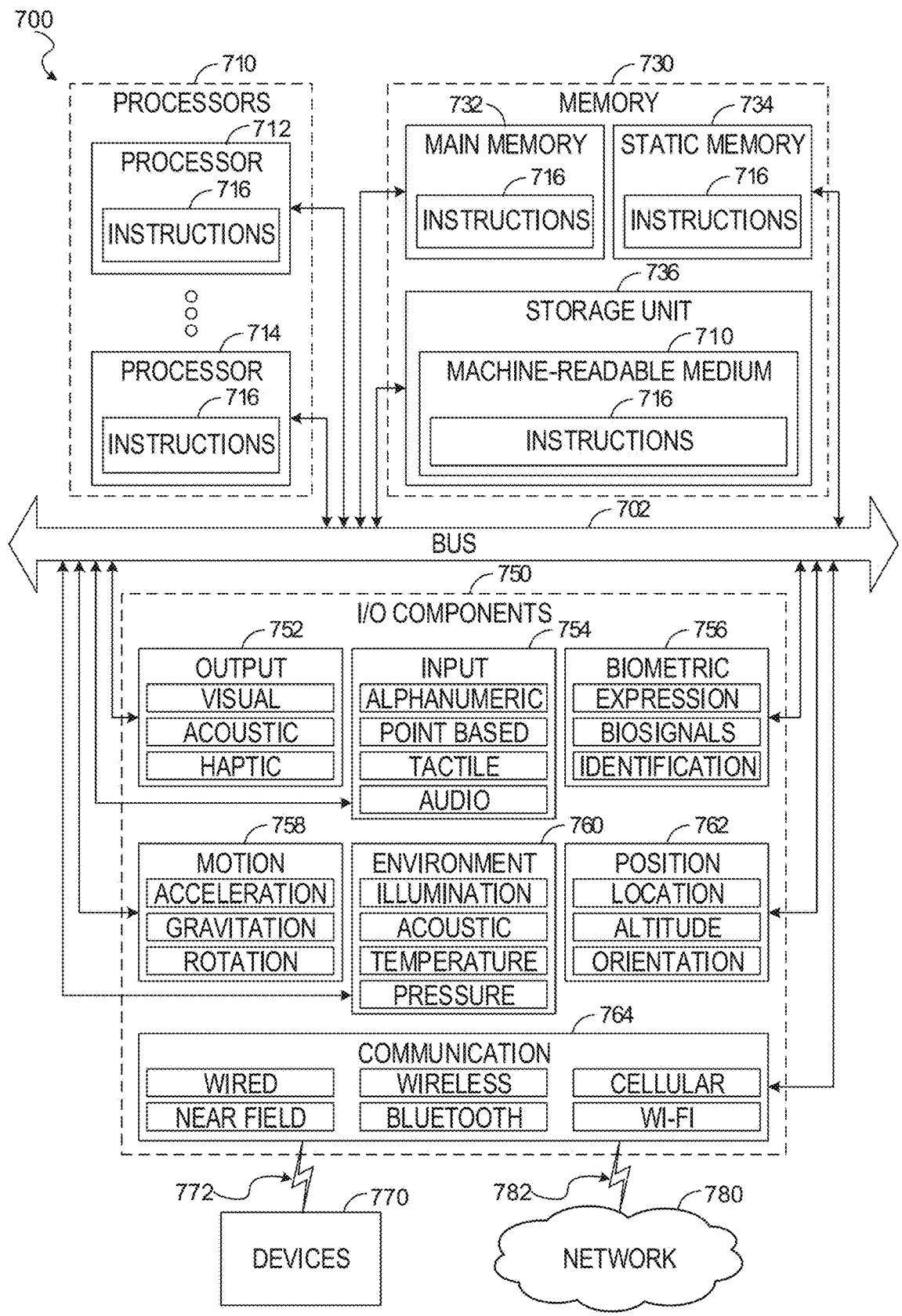
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms, other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS)

technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computerized method comprising:
   training a first machine learned model to output an embedding for an entity, the entity being a user or a piece of content, the embedding describing a mapping of the entity to a point in a D-dimensional space, where D is a fixed number of dimensions;
   obtaining training data for a second machine learned model, the training data including entities and usage data, the usage data indicating fully positive actions and partially positive actions performed by users on pieces of content;
   extracting entities from the training data, the entities including a first user and a first piece of content, the first user having performed a partially positive action in the usage data on the first piece of content;
   passing the extracted entities to the first machine learned model to obtain an embedding for a passed entity;
   calculating, by the first machine learning model, an entity similarity score for the first user and the first piece of content in the extracted entities based on their embeddings;
   calculating, by the first machine learning model, an activity similarity score for the first user and the first piece of content in the extracted entities based on a user activity embedding derived from the entity similarity score and the embeddings from the first machine learned model;
   calculating, by the first machine learning model, a user interest level for a first pair of the first user and the first piece of content based on the entity similarity score and the activity similarity score;
   labelling the first pair based on the calculated user interest level; and
   causing the second machine learning model to be trained using the labelled first pair.

2. The computerized method of claim 1, further comprising:
   aggregating embeddings for a plurality of pieces of content on which the first user performed a partially positive action; and
   performing a function on the aggregated embeddings to calculate the user activity embedding.

3. The computerized method of claim 2, wherein the calculating an activity similarity score comprises computing a dot product of the user activity embedding and the embedding for the first piece of content.

4. The computerized method of claim 1, wherein the training of the first machine learned model includes training a neural network by:
   obtaining labelled pairs of users and pieces of content, wherein each labelled pair includes features of a given user, features of a given piece of content, and a label corresponding to the given user and the given piece of content, the label indicative of a positive or negative association between the given user and the given piece of content; and
   passing the labelled pairs of users and pieces of content to a neural network machine learning algorithm.

5. The computerized method of claim 2, wherein the function is an average function.

6. The computerized method of claim 2, wherein the function is a mean function.

7. The computerized method of claim 2, further comprising:
   performing a minimum function on the aggregated embedding to calculate a user activity minimum embedding; and
   wherein the calculating a user interest level is further based on the user activity minimum embedding.

8. The computerized method of claim 1, wherein the calculating a user interest level comprises computing a weighted sum of the entity similarity score and the activity similarity score.

9. The computerized method of claim 1, wherein the pieces of content are job listings and the fully positive actions include applying for a job associated with a job listing.

10. The computerized method of claim 9, wherein the partially positive actions include clicking on a job listing.

11. The computerized method of claim 1, wherein the second machine learning algorithm is a logistic regression machine learning algorithm.

12. The computerized method of claim 11, further comprising:
   extracting features corresponding to a second user and features corresponding to a second piece of content;
   passing the features corresponding to the second user and features corresponding to the second piece of content to the first machine learned model, to obtain an embedding for each second user and an embedding for the second piece of content;
   calculating an entity similarity score for the second user and the second piece of content in the extracted entities based on their embeddings;

aggregating embeddings for any pieces of content on which the second user performed a partially positive action;

performing the function on the aggregated embeddings for any pieces of content on which the second user performed a partially positive action to calculate a user activity embedding for the second user;

calculating an activity similarity score for the second user and the second piece of content in the extracted entities based on the user activity embedding for the second user and an embedding for the second piece of content; and calculating a user interest level for a second pair of the second user and the second piece of content based on the entity similarity score for the second user and the second piece of content and the activity similarity score for the second user and the second piece of content.

13. A system comprising:

a non-transitory computer-readable medium having instructions stored thereon, which, when executed by a processor, cause the system to perform operations comprising:

training a first machine learned model to output an embedding for an entity, the entity being a user or a piece of content, the embedding describing a mapping of the entity to a point in a D-dimensional space, where D is a fixed number of dimensions;

obtaining training data for a second machine learned model, the training data including entities and usage data, the usage data indicating fully positive actions and partially positive actions performed by users on pieces of content;

extracting entities from the training data, the entities including a first user and a first piece of content, the first user having performed a partially positive action in the usage data on the first piece of content;

passing the extracted entities to the first machine learned model to obtain an embedding for a passed entity;

calculating, by the first machine learning model, an entity similarity score for the first user and the first piece of content in the extracted entities based on their embeddings;

calculating, by the first machine learning model, an activity similarity score for the first user and the first piece of content in the extracted entities based on a user activity embedding derived from the entity similarity score and the embeddings from the first machine learned model;

calculating, by the first machine learning model, a user interest level for a first pair of the first user and the first piece of content based on the entity similarity score and the activity similarity score;

labelling the first pair based on the calculated user interest level; and causing the second machine learning model to be trained using the labelled first pair.

14. The system of claim 13, wherein the operations further comprise:

aggregating embeddings for a plurality of pieces of content on which the first user performed a partially positive action; and performing a function on the aggregated embeddings to calculate the user activity embedding.

15. The system of claim 14, wherein the training of the first machine learned model includes training a neural network by:

obtaining labelled pairs of users and pieces of content, wherein each labelled pair includes features of a given user, features of a given piece of content, and a label corresponding to the given user and the given piece of content, the label indicative of a positive or negative association between the given user and the given piece of content; and passing the labelled pairs of users and pieces of content to a neural network machine learning algorithm.

16. The system of claim 14, wherein the calculating an activity similarity score comprises computing a dot product of the user activity embedding and the embedding for the first piece of content.

17. The system of claim 14, wherein the function is an average function.

18. The system of claim 14, wherein the function is a mean function.

* * * * *